United States Patent [19]

Davis et al.

[11] 4,234,767
[45] Nov. 18, 1980

[54] CIRCUIT SELECTOR

[75] Inventors: Ariel R. Davis, Provo; Worthington W. Greene, Salt Lake City, both of Utah

[73] Assignee: Rual Industries, Inc., Salt Lake City, Utah

[21] Appl. No.: 939,125

[22] Filed: Sep. 5, 1978

[51] Int. Cl.³ .............................................. H01H 9/00
[52] U.S. Cl. .................................. 200/1 R; 200/16 B; 200/16 C; 361/350
[58] Field of Search .................... 200/1 R, 16 B, 6 D; 361/346, 347, 350, 351, 425

[56] References Cited

U.S. PATENT DOCUMENTS

| 3,603,747 | 9/1971 | Davis | 200/16 C |
| 4,041,257 | 8/1977 | Yancey | 200/1 R |

Primary Examiner—J. V. Truhe
Assistant Examiner—Morris Ginsburg
Attorney, Agent, or Firm—Criddle & Western

[57] ABSTRACT

A circuit selector, particularly adapted for the control of stage lights and the like. A support frame carries a group of input buss bars that are individually connected to power sources through dimmer control devices. A load control switch corresponding to each connected buss bar is also mounted on the support frame. At least one load slider member is arranged to be repositioned and engaged with a selected one of the input buss bars while making electrical contact through a slide or guide rail for the slider member between a selected input buss bar and the corresponding load control switch. The slider member is yieldably actuated to a circuit making position and is positively latched in a retracted condition to freely move along the guide rail as it is positioned for engagement with a selected input buss bar. The input buss bars are separated by insulator plates, telescoping spacers, and the input buss bars and insulator plates and telescoping spacers are sandwiched together by nuts threaded on the ends of a threaded shaft passed through the interleaved input buss bars, insulator plates and telescoping spacers. The telescoping spacers are used as insulators between buss bars and between the buss bars and the shaft and the spacers insure uniform spacing between adjacent buss bars and insulator plates and proper positioning of the buss bars as they are engaged by a contactor foot of the slider member.

26 Claims, 8 Drawing Figures

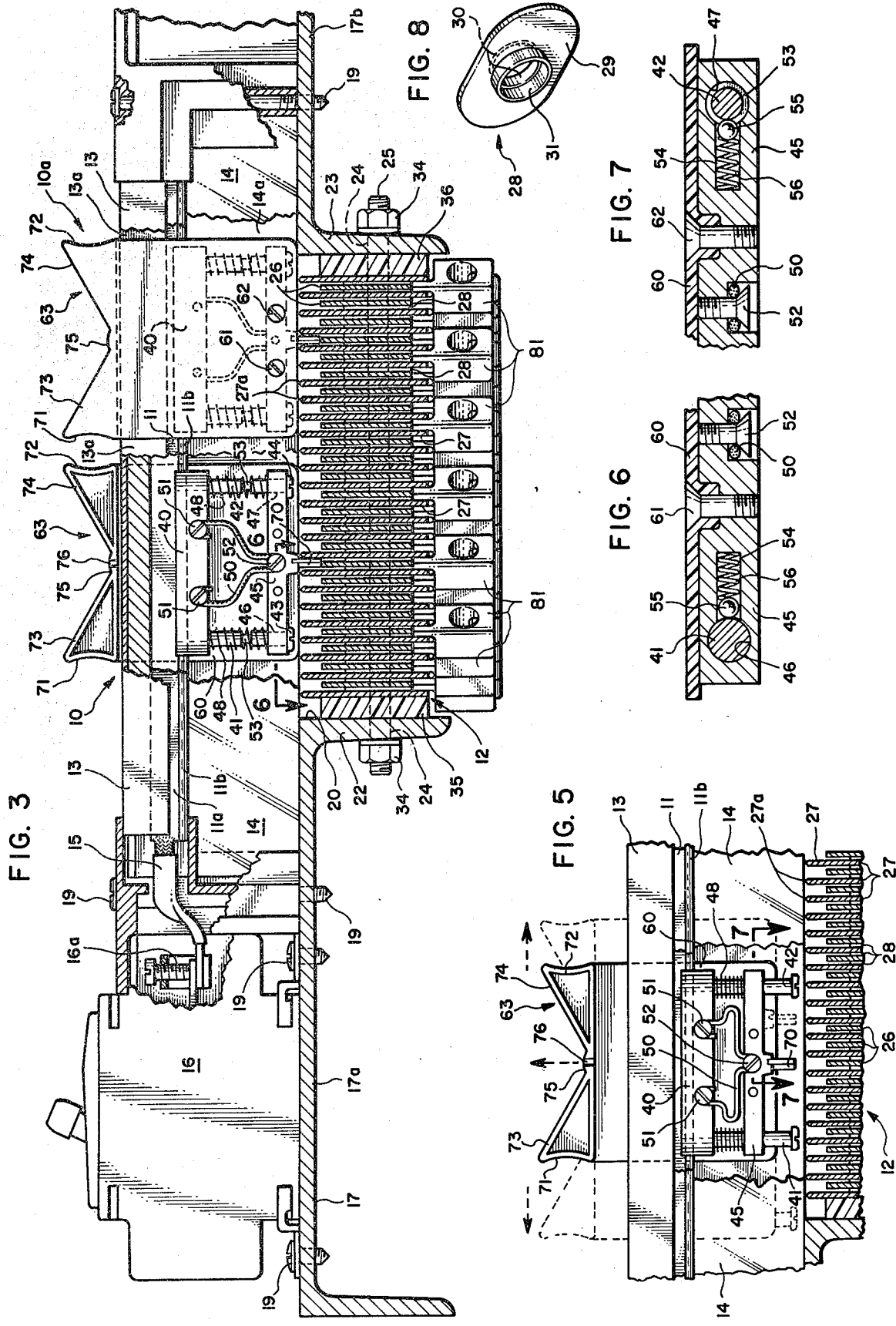

CIRCUIT SELECTOR

BRIEF DESCRIPTION OF THE INVENTION

1. Field of the Invention

This invention relates to control devices used to selectively connect electrical circuits and particularly to such devices as are commonly used to operate stage lights during theatrical performances and the like.

2. Prior Art

Various types of control devices have been used to operate stage lights in the past. These generally have involved a number of relay switches arranged in a common panel for convenience purposes. More recently, Rual Industries, Inc. of Salt Lake City, Utah has produced and marketed a patch panel for use in stage lighting that utilizes input buss bars and slidable members to selectively make electrical contact with the buss bars. This known device, however, while providing for easier and more reliable control operation, has not proven to be entirely satisfactory. The patch panel of Rual Industries includes a slider member that must be retracted from spring biased engagement with one buss bar and be held in the retracted position as it is moved into position to be released to engage another buss bar, and the slider member is difficult to retract and to hold and slide at the same time. Furthermore, the placement and assembly of the buss bars has been cumbersome and not entirely satisfactory, and a positive electrical contact is not always established. In addition, the structural support for the slider members has not always been adequate when spanning large numbers of buss bars and the support will at times bend to make it even more difficult to move the slider members therealong.

SUMMARY OF THE INVENTION

A principal object of the present invention is to provide a control device suitable for regulating and operating stage lights and the like.

Other objects are to provide such a device that can be easily manipulated, that will provide a positive indexing of a slider member for positive electrical contact, that can be readily moved to meet changing load needs—such as the need for additional lighting loads, and that can be readily combined with other such devices for expanded use.

Principal features of the invention include the use of a two-piece support frame with a group of input buss bars to which electrical circuits are connected mounted between the frame pieces; guide rails; a multiple number of load control switches electrically connected to lights or the like to be regulated and controlled; and at least one slider member arranged to reciprocate on a guide rail and to be selectively positioned to complete a circuit through a buss bar and the guide rail to a load control switch.

Other features include an interleaved buss bar construction wherein buss bars are uniformly spaced and are uniformly separated by insulator plates and telescoping spacers clamped together by threaded rods with nuts thereon.

Other objects and features of the invention will become apparent from the following detailed description and drawings, disclosing what is presently contemplated as being the best mode of the invention.

THE DRAWINGS

In the Drawings:

FIG. 1 is a perspective view of a patch panel incorporating load circuit selectors of the present invention;

FIG. 2, a transverse section taken on the line 2—2 of FIG. 1 rotated to be shown horizontally for clarity;

FIG. 3, a longitudinal section, partially broken away for clarity, taken on the line 3—3 of FIG. 1;

FIG. 4, a fragmentary enlarged section, taken on the line 4—4 of FIG. 2;

FIG. 5, portion of FIG. 3 showing a slider member in a reciprocating position;

FIG. 6, an enlarged transverse section, taken on the line 6—6 of FIG. 3;

FIG. 7, a similarly enlarged transverse section, taken on the line 7—7 of FIG. 5; and FIG. 8, a perspective view of a spacer of the invention.

DETAILED DESCRIPTION

Figure 1:
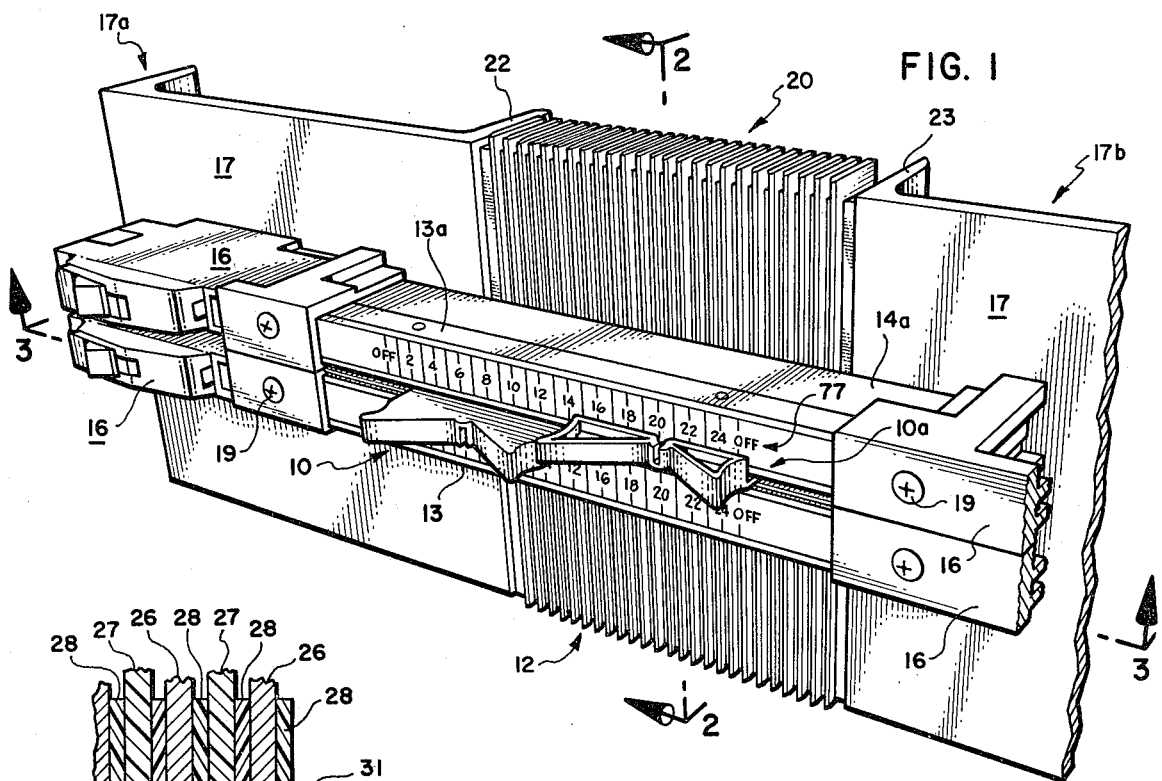
Figure 4:
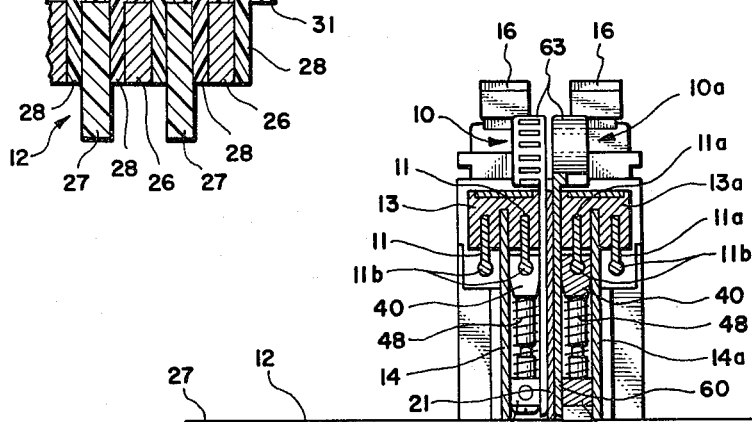

Referring now to the drawings:

In the illustrated preferred embodiment the circuit selector of the invention comprises a slider member, shown generally at 10, a guide rail 11 for the slider member, and a contact of buss bar assembly, shown generally at 12.

Figure 2:
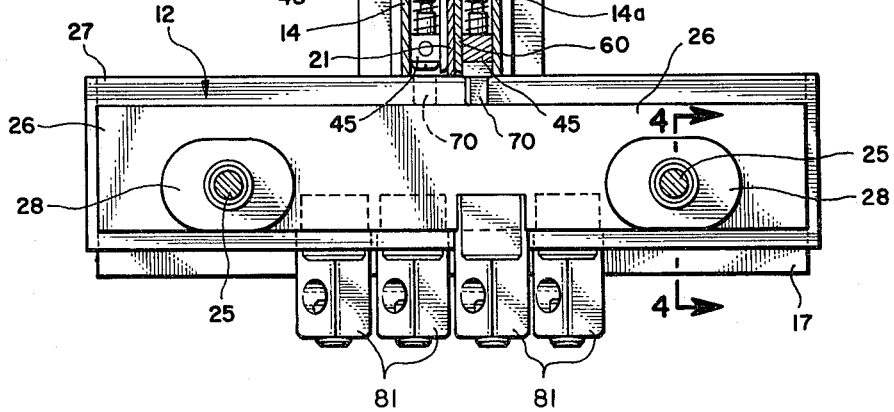

As illustrated in FIGS. 1-3, a pair of slider members 10 and 10a are respectively arranged on guide rails 11 and 11a.

Looking at FIG. 2 it will be seen that the guide rails 11 and 11a are each part of a pair of such rails carried by and projecting from header bars 13 and 13a.

The header bars 13 and 13a are respectively supported by centrally positioned support bars 14 and 14a. The support bars 14 and 14a thus each serve as an insulator between the guide rails carried by the header to which the support bars are attached. The header bars and support bars form structural members that will rigidly support the guide rails, without bending, even across a large buss bar assembly.

The guide rails 11 and 11a are preferably made of extruded aluminum or copper and include a bead 11b of round cross-sectional configuration at the edge remote from the header bar. Each guide rail is electrically connected by a flexible, insulated conductor 15 soldered at one end thereof to an input terminal 16a of a load control switch 16. A load control switch 16 is provided at each end of each header bar 13 and 13a and the load control switches 16 are mounted to platforms 17 of channel shaped support frame portions 17a and 17b, by screws 19.

As best viewed in FIG. 3, the header bars 13 and 13a fit into the housing of the switches 16 and ends of each support bar 14 and 14a rest on the platforms 17 while the intermediate portions of the support bars span an opening 20 formed between the frame portions 17a and 17b. A divider plate 21 held between the header bars 13 and 13a and spanning the opening 20 serves as an insulator between adjacent guide rails 11 and 11a.

Flanges 22 and 23 of the support frame portions 17a and 17b are provided at opposite ends of the opening 20. The flanges have aligned holes 24 therein through which rods 25 are adapted to be inserted to clamp interleaved buss bars 26 and insulator plates 27 of the buss bar assembly 12 together.

Each buss bar 26 is formed from a piece of copper or other such electrically conductive material and the buss bars are preferably of substantially uniform size and thickness. The insulator plates are also of substantially uniform size and thickness and are somewhat longer and wider than the buss bars. As seen best in FIG. 3, the edges 27a of the insulator plates extending into opening 20 beyond the buss bars are made pointed and the opposite edges also extend past the buss bars.

Insulating spacers 28 (FIG. 8) are used to insulate the rods on which the buss bars and insulator plates are clamped and to space the buss bars between adjacent insulator plates. As shown best in FIG. 8, each insulating spacer includes a flat central spacer wall 29 having a ring 30 projecting from one side and a ring 31 projecting from the opposite side thereof. The ring 30 is smaller than the ring 31 and has an outside diameter just slightly larger than the inside diameter of ring 31 so that each ring 30 will compress to fit fully and snugly inside a ring 31. The outside diameter of ring 31 is just smaller than the aligned holes provided in flanges 22 and 23, buss bars 26 and insulator plates 27 and the inside diameter of ring 30 is just large enough to fit over the rods 25 used with nuts 34 threaded on the ends of the rods to clamp the buss bars and insulator plates in interleaved fashion. The extension of ring 31 from flat spacer wall 29 is just greater (in the order of a few thousandths of an inch) than the thickness of either the buss bar or the insulating plate fitted thereover to accommodate any variations in manufacturing tolerances of the buss bars and insulating plates. The spacers 28 thus insure uniform spacing between buss bars and permit accurate indexing on the header bars. Additional spacer blocks 35 and 36 may be used, if desired, between the interleaved buss bars and insulator plates and the flanges 22 and 23. When the buss bars and insulator plates are assembled, spacers 28 are positioned such that a spacer wall is adjacent each side of each buss bar, with a ring 30 of one spacer extending through the hole in the buss bar to telescope into a ring 31 of the spacer on the other side of the buss bar. The insulator plates at opposite sides of the buss bar then fit over the ring 31 of the next attached spacer and the ring 31 projecting from the first spacer. The extension length of ring 31 thus determines the spacing between adjacent buss bars and insulator plates. The same pattern of telescoped spacers and interleaved buss bars and insulator plates is followed to provide the buss bar assembly of the circuit selector. It will be apparent that any desired number of buss bars can be arranged in the assembly.

As best illustrated in FIGS. 1-3, a pair of slider members 10 and 10a are arranged to reciprocate across the opening 20 and the buss bar assembly 12 arranged at the opening. The slider members each move on a guide rail 11 or 11a.

Each slider member includes a hanger 40 made of extruded aluminum or the like and with an elongate notch therein adapted to fit over the bead 11b of a guide rail. The hanger 40 is thus arranged to reciprocate along the guide rail to which it is attached.

Pins 41 and 42 have threaded ends turned into each hanger and extend towards the platform 17 to terminate in heads 43 and 44. A contact bar 45 has holes 46 and 47 through the ends thereof and the bar is guided by and will move along the pins. A spring 48 on each pin 41 and 42 acts between the hanger 40 and the contact bar to bias the contact bar towards the heads 43 and 44.

A flexible shunt cable 50, made of tinned copper or the like, has its ends connected by screws 51 to hanger 40 and is connected intermediate its length to the contact bar by a screw 52. The shunt cable is long enough to allow full movement of the contact bar 45 along the pins 41 and 42.

Each pin 41 and 42 has a notch 53 formed therein intermediate its length. Bores 54 (FIGS. 6 and 7) in the contact bar intercept the holes 46 and 47 and balls 55 in the bores 54 are biased by springs 56 into engagement with the pins 41 and 42. When the contact bars 45 are retracted along the pins 41 and 42, the springs 56 bias the balls 55 into the notches 53 to hold the contact bar in the retracted position.

An actuator plate 60, made of non-conductive, durable material such as plastic, has one edge secured to each contact bar 45 by screws 61 and 62 and extends alongside the hanger 40 to which the contact bar is attached, and past the header bar 13 to terminate in a slider grip 63. Each slider grip is enlarged to extent over the header bar and provides a means whereby the actuator bar attached thereto may be moved to its retracted position latched on the pins 41 and 42 and with the balls 55 biased by springs 56 into the notches 53. The slider grips 63 also provide means for sliding the contact bars to which they are attached and connected hanger along the guide rail on which the hanger is mounted and for releasing the contact bar from its retracted position so that it may be biased along the pins 41 and 42 towards the heads 43 and 44 of the pins to a release position.

A contactor foot 70 projects from each contact bar 45 and is adapted to extend between adjacent insulator plates 27 and to engage an interleaved buss bar 26 when the contact bar is in its released position and is biased by springs 48 towards the heads 43 and 44 of pins 41 and 42. Each contactor foot 70 is angled with respect to the edge of the buss bar to be engaged. Thus, as the foot 70 is biased between the adjacent insulator plates it will extend diagonally across the edge of the interleaved buss bar to make a positive contact and will not extend into a space between the buss bar and an adjacent insulator plate. The knife edge configuration of the insulator plates helps to guide the contactor foot between the adjacent insulator plates and into engagement with a buss bar.

The slider grips 63 are each of a wing shaped configuration, with the ends 71 and 72 of wings 73 and 74 thereof made concave to provide for easier gripping as the slider grip is pulled to retract the contact bar and is moved along the slider bar. The wings are large at the ends 71 and 72 and each taper to a small center portion 75 that is in direct alignment with the contactor foot 70 of the contact bar to which the actuator plate is attached. A notch 76 in the center portion 75 is adapted to align with numbered and lettered markings 77 on the header bar and the markings 77 are aligned with the interleaved buss bars so that when the notch 76 is aligned with a marking 77 and the associated contact bar 45 is released from its retracted position the springs 48 will bias the contact bar unitl its contactor foot 70 engages a buss bar 26. The springs 48, acting between the hanger and contact bar also bias the hanger into tight electrical contact with the guide rail 11 or 11a on which the hanger slides. Thus, a circuit path is completed through the selected buss bar, the contactor foot 70, the associated contact bar 45, the attached shunt cable 50, pins 41 and 42, hanger 40, the associated guide rail 11 or 11a, flexible connector 15, and the associated control switch 16 to the stage lights, or the like, being operated. Electrical lines, not shown, are used to connect the buss plates 26 to power sources, not shown, through connectors 81 that straddle buss plates and that are silver soldered thereto. Each contactor foot 70 is made of tungsten carbide and is silver soldered to this contact bar to insure a good electrical contact between the buss bar and the contact bar.

It will be apparent from the preceding description thus far that more than one load circuit selector can be conveniently arranged to provide a patch panel suitable for connecting any combination of slider members with any buss bar.

Although a preferred embodiment of my invention has been herein disclosed, it is to be understood that the present disclosure is by way of example and that variations are possible without departing from the subject matter coming within the scope of the following claims, which subject matter I regard as my invention.

We claim:

1. A circuit selector comprising
   a support frame;
   a plurality of spaced apart buss bars carried by said support frame;
   means for connecting each of said buss bars to a source of power;
   an electrically conductive guide rail carried by the support frame;
   means for electrically connecting said guide rail to stage lights or the like to be operated;
   a slider member including a hanger slidable on said guide rail;
   a contact bar;
   means mounting said contact bar to be carried by said hanger and to be biased away from said hanger towards said buss bars;
   a contactor foot carried by said contact bar, said contactor foot being arranged to engage one of said buss bars when said contact bar is fully biased away from said hanger; and
   means carried by the support frame for latching said contact bar in a retracted position with the contractor foot out of engagement with said buss bars; and
   an electrically conductive flexible shunt cable interconnecting the contact bar and the hanger, whereby an electrical circuit is completed through the contactor foot, the contact bar, the shunt cable and hanger to the guide rail.

2. A circuit selector as in claim 1, wherein
   the guide rail is supported by a rigid, non-conductive header member carried by the support frame.

3. A circuit selector as in claim 2, wherein
   the guide rail projects from the header member and has a head formed on an edge remote from the header member; and
   the hanger has an elongate notch formed therein and fitting onto said bead of the guide rail.

4. A circuit selector as in claim 1, wherein
   the contact bar is slidable towards and away from the buss bars on pins carried by the hanger and is biased away from the hanger by springs surrounding the pins and positioned between the hanger and the contact bar.

5. A circuit selector as in claim 4, wherein the means for latching the contact bar in a retracted position includes
   a notch in each pin on which the contact bar slides;
   bore holes in the contact bar;
   detent balls in the bore holes, said detent balls being adapted to fit into said notches; and
   springs in the bore holes biasing said balls into engagement with said pins.

6. A circuit selector as in claim 1, wherein
   an insulator plate of electrically non-conductive material is positioned between each buss bar and the contactor foot extends between adjacent insulator plates to engage a buss bar.

7. A circuit selector as in claim 2, further including
   an actuator plate fixed to the contact bar and extending past the hanger and the header member to terminate in a slider grip, by which said actuator plate and attached contact bar and contactor foot are moved toward and away from the buss bars.

8. A circuit selector as in claim 7, wherein
   the slider grip is of wing shaped configuration with large wing portions tapering to a small center portion being aligned with the contactor foot, the ends of said large wing portions being concave to facilitate grasping thereof.

9. A circuit selector as in claim 8, wherein
   a notch is provided in the small center portion of the slider grip, said notch being arranged to be aligned with identifying legends on the header member and each said legend being aligned with a buss bar whereby said slider grip is positioned by aligning said notch with a legend to permit engagement of the contactor foot with a selected buss bar.

10. A circuit selector as in claim 6, wherein
    the buss bars and insulator plates are secured together in interleaved fashion by threaded rod means passed therethrough and nuts threaded onto the rod means and wherein non-conductive telescoping spacers are used to insulate said buss bars from said rod means and to provide equal spacing between adjacent insulator plates.

11. A circuit selector as in claim 1, wherein
    the contactor foot is angled to extend angularly across a buss bar when the foot engages such buss bar.

12. A circuit selector as in claim 6, wherein
    the insulator plates are larger than the buss bars and the edges of the insulator plates nearest to the slider member are pointed to provide for better entrance of the contactor foot therebetween to engage the buss bars positioned therebetween.

13. A circuit selector as in claim 3, wherein
    the contact bar is slidable towards and away from the buss bars on pins carried by the hanger and is biased away from the hanger by springs surrounding the pins and positioned between the hanger and the contact bar.

14. A circuit selector as in claim 13, wherein the means for latching the contact bar in a retracted position includes
    a notch in each pin on which the contact bar slides;
    bore holes in the contact bar;
    detent balls in the bore holes, said detent balls being adapted to fit into said notches; and
    springs in the bore holes biasing said balls into engagement with said pins.

15. A circuit selector as in claim 4, wherein
    an insulator plate of electrically non-conductive material is positioned between each buss bar and the contactor foot extends between adjacent insulator plates to engage a buss bar.

16. A circuit selector as in claim 15, further including
    an actuator plate fixed to the contact bar and extending past the hanger and a header member to terminate in a slider grip, by which an actuator plate and attached contact plate and contactor foot are moved toward and away from the buss bars.

17. A circuit selector as in claim 16, wherein the slider grip is of wing shaped configuration with large wing portions tapering to a small center portion being aligned with the contactor foot, the ends of said large wing portions being concave to facilitate grasping thereof.

18. A circuit selector as in claim 17, wherein a notch is provided in the small center portion of the slider grip, said notch being arranged to be aligned with identifying legends on the header member and each said legend being aligned with a buss bar whereby said slider grip is positioned by aligning said notch with a legend to permit engagement of the contactor foot with a selected buss bar.

19. A circuit selector as in claim 18, wherein the buss bars and insulator plates are secured together in interleaved fashion by threaded rod means passed therethrough and nuts threaded onto the rod means and wherein non-conductive telescoping spacers are used to insulate said buss bars from said rod means and to provide equal spacing between adjacent insulator plates.

20. A circuit selector as in claim 6, further including an actuator plate fixed to the contact bar and extending past the hanger and a header member to terminate in a slider grip, by which an actuator plate and attached contact bar and contactor foot are moved toward and away from the buss bars.

21. A circuit selector as in claim 20, wherein the slider grip is of wing shaped configuration with large wing portions tapering to a small center portion being aligned with the contactor foot, the ends of said large wing portions being concave to facilitate grasping thereof.

22. A circuit selector as in claim 21, wherein a notch is provided in the small center portion of the slider grip, said notch being arranged to be aligned with identifying legends on the header member and each said legend being aligned with a buss bar whereby said slider grip is positioned by aligning said notch with a legend to permit engagement of the contactor foot with a selected buss bar.

23. A circuit selector as in claim 22, wherein the buss bars and insulator plates are secured together in interleaved fashion by threaded rod means passed therethrough and nuts threaded onto the rod means and wherein non-conductive telescoping spacers are used to insulate said buss bars from said rod means and to provide equal spacing between adjacent insulator plates.

24. A circuit selector as in claim 23, wherein the contactor foot is angled to extend angularly across a buss bar when the foot engages such buss bar.

25. A circuit selector as in claim 6, wherein the contactor foot is angled to extend angularly across a buss bar when the foot engages such buss bar.

26. A circuit selector as in claim 25, wherein the insulator plates are larger than the buss bars and the edges of the insulator plates nearest to the slider member are pointed to provide for better entrance of the contactor foot therebetween to engage the buss bars positioned therebetween.

* * * * *